United States Patent [19]

Hagiwara et al.

[11] 4,154,364
[45] May 15, 1979

[54] THERMALLY INSULATING CONTAINERS FOR LIQUEFIED GASES

[75] Inventors: Zenji Hagiwara, Kusatsu; Sigeo Matsui, Kobe; Yamanaka, Yoshio; Akira Kamei, both of Takefu; Susumu Sakaguchi, Yokohama, all of Japan

[73] Assignees: Shin-Etsu Chemical Co., Ltd., Tokyo; Osaka Oxygen Industries, Ltd., Osaka, both of Japan

[21] Appl. No.: 753,689

[22] Filed: Dec. 23, 1976

[30] Foreign Application Priority Data

Dec. 30, 1975 [JP] Japan .............................. 50-156434
Jan. 14, 1976 [JP] Japan .................................. 51-3638

[51] Int. Cl.² ............................................. B65D 25/18
[52] U.S. Cl. ................................. 220/422; 34/15; 75/134 F; 75/152; 75/171
[58] Field of Search ................. 75/134 F, 152, 170, 75/171; 55/16, 74; 34/15; 220/422, 426, 901

[56] References Cited

U.S. PATENT DOCUMENTS

| 3,114,469 | 12/1963 | Francis et al. | 220/9 |
| 3,189,446 | 6/1965 | Calkins et al. | 75/171 |
| 3,825,418 | 7/1974 | Reilly et al. | 75/170 |
| 3,883,346 | 5/1975 | Martin | 75/170 |
| 3,910,831 | 10/1975 | Helart | 55/74 |
| 3,918,933 | 11/1975 | Martin | 75/170 X |
| 3,922,872 | 12/1975 | Reilly et al. | 34/15 |

OTHER PUBLICATIONS

Journal of the Less-Common Metals, 35, 1974, pp. 65–76.

*Primary Examiner*—R. Dean
*Attorney, Agent, or Firm*—Toren, McGeady and Stanger

[57] ABSTRACT

Thermally insulating containers or the Dewar containers useful for shipping and storage of low-temperature liquefied gases, having double walls made of a metal, the space between the walls being evacuated, are provided, the thermal insulation properties of which are prevented from deterioration by putting in the vacuum space, a getter alloy composed of a ternary alloy expressed by the formula $LaNi_xCr_y$, where x is a number from 1 to 6, both inclusive and y is a number from 0.1 to 2, both inclusive, working to adsorb traces of hydrogen coming out of the wall material. The alloy is preferably an activated one. The vacuum thermal insulation can further be improved by the presence of an adsorbent having a large specific area which serves to adsorb traces of gases other than hydrogen.

8 Claims, 3 Drawing Figures

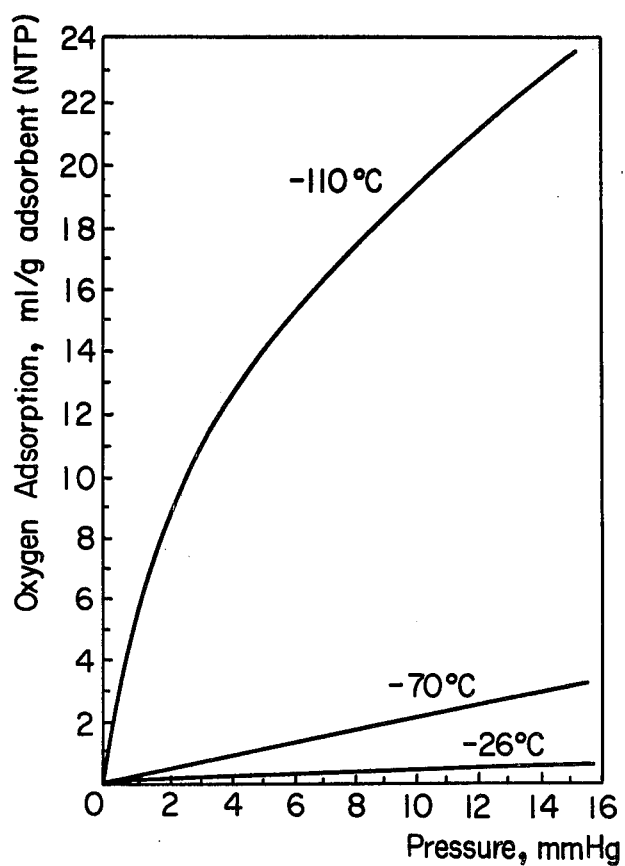

THERMALLY INSULATING CONTAINERS FOR LIQUEFIED GASES

BACKGROUND OF THE INVENTION

The present invention relates to an improvement in a thermally insulating container or the Dewar container. In particular, the invention relates to a thermally insulating container useful for storage and transportation of low-temperature liquefied gases, having double walls with an evacuated space in between, which is improved in the preservation of thermal insulation properties over a prolonged duration of storage or transportation.

In the prior art, thermally insulating containers for storage and transportation of low-temperature liquefied gases, such as, liquid nitrogen, liquid oxygen, liquid helium, liquid argon, liquid hydrogen, liquefied natural gas and the like, have two or more walls made usually of a metal with the spaces between the walls evacuated to a highly reduced pressure. These metal vacuum containers have been intended to prevent heat transfer from outside by means of vacuum thermal insulation and reduce the evaporation loss of a liquefied gas contained therein. In order to further reduce such heat transfer, it has been proposed to provide multi-laminar thermal insulators made of material having a low heat conductivity within the evacuated space, or on the surfaces facing the vacuum.

The degree of vacuum in the thermally insulating container is required to be as high as possible to obtain the most excellent thermal insulation, while it is a general trend that such vacuum thermal insulation gradually decreases in the long run. The reason for the decreasing tendency in the thermal insulation is supposed to be an increase in pressure within the vacuum due to release from the inside the walls of traces of certain gases inherently existing within the metal constituting the walls. Therefore, attempts have been made to prevent such released gases from being isolated and accumulated within the vacuum, but successful and satisfactory results have not been achieved.

SUMMARY OF THE INVENTION

It is therefore the primary object of the present invention to provide an improved thermally insulating container useful for shipment and storage of low-temperature liquefied gases, free of the above problem of decreasing in vacuum thermal insulation in the long run over extended time periods.

In accordance with the present invention, the thermally insulating container comprises double walls, i.e., inner and outer walls, the space between the walls being evacuated to a high vacuum and a getter alloy being provided in the vacuum, having the composition of $LaNi_xCr_y$ in which x has a value of from 1.0 inclusive to 6.0 inclusive and y has a value of from 0.1 inclusive to 2.0 inclusive. The getter alloy exhibits an unexpectedly great efficiency for adsorbing traces of hydrogen gas even at low temperatures at which conventional getter materials have been found rather ineffective for the purpose.

The efficiency of the getter alloy in accordance with the invention can further be enhanced by having the getter alloy activated in advance with heat at 100° to 700° C. in a stream of hydrogen gas over a period of more than 30 minutes, and subjecting the heated material to the following cycles at least twice in repetition, each cycle consisting of pressurization with hydrogen gas to a pressure of not less than 10 kg/cm$^2$ where the pressure is maintained for at least 5 minutes and evacuation to a certain high vacuum.

It is also possible to improve the thermal insulation of the container by additionally mounting an adsorbent having a large specific surface area within the vacuum for the purpose of adsorbing traces of any gases other than hydrogen released from inside the wall material and entering into the vacuum.

BRIEF DESCRIPTION OF THE DRAWINGS

In the accompanying drawings:

FIG. 3 is also a graph showing the adsorption isotherms for the adsorbent as tested.

DETAILED DESCRIPTION OF THE PREFERRED EMBODIMENTS

Figure 1:
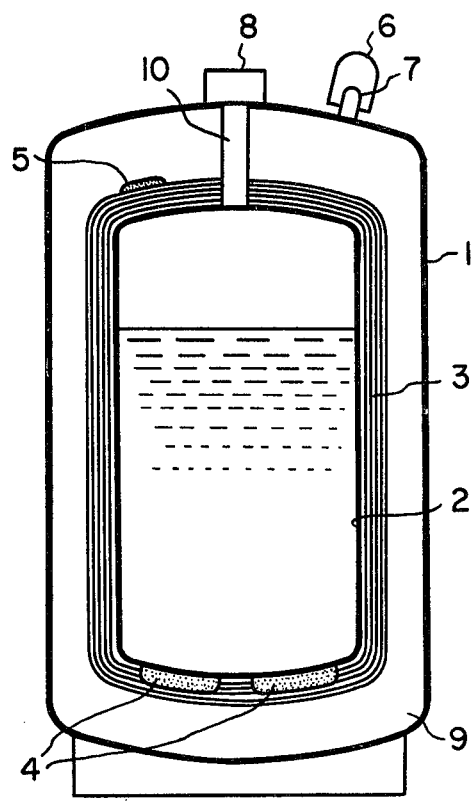
FIG. 1 is a schematic illustration by cross sectional view of a cylindrical double-walled thermally insulating container as a preferred embodiment of the present invention.

The extensive investigations of the inventors have disclosed that certain amounts of hydrogen gas are always present in the vacuum of the thermally insulating containers for liquefied gases along with the other gaseous constituents of the air, such as, oxygen, nitrogen, argon, carbon dioxide, as well as hydrocarbons and the like, and that the presence of hydrogen gas in the vacuum adversely affects the vacuum thermal insulation over extended time periods.

It may be that the source from which hydrogen gas comes into the vacuum of the container is the material constituting the walls, i.e., a metal. Since the metal materials, such as, stainless steel, carbon steel, aluminum and the like, per se readily absorb or adsorb hydrogen gas, it is presumed that the hydrogen gas absorbed in the metal walls of the container during the manufacturing process diffuses gradually over a period of time towards the surfaces of the walls and finally moves into and accumulate in the vacuum.

In order to prevent the vacuum thermal insulation of the thermally insulating container from decreasing as a result of the accumulation of the residual gases in the vacuum, it is required to continuously remove the gases from the vacuum so that a high level of vacuum may be maintained throughout the life of the container. One of the means for such removal of the gases is the use of a getter material placed within the vacuum. According to the prior art, known getter materials are barium or palladium. These metals, however, have been found unsatisfactory because of their ineffective adsorptivity of hydrogen gas especially at low temperatures, as well as their high cost.

According further to the prior art, an improved method has been proposed for the removal of the residual gases from the vacuum by use of an adsorbent, such as, a natural or synthetic zeolite ion-exchanged with precious metals, having a large adsorption capacity for the ordinary atmospheric gases, which is mounted within the vacuum in addition to the above-given getter metal. The use of such an adsorbent, however, has been found almost ineffective for the purpose of removing the residual hydrogen gas, since those adsorbents have a poor adsorptivity for hydrogen gas. Thus, all the prior art thermally insulating containers are thought to be inevitably defective in view of the above-described problems.

Recently, certain metals and alloys having a good adsorptivity for hydrogen gas, have been developed for the storage and purification of hydrogen gas. As the most suitable alloys, several of those containing rare earth metals have been proposed. One example is a binary alloy of lanthanum and aluminum employed for the storage of hydrogen gas (see, for example, Japanese Patent Disclosure No. 50-114325). Another example is an alloy of a rare earth metal and one or more non-rare earth metals, such as, cobalt, nickel, iron, copper and chromium, for the purification of hydrogen gas (see, for example, U.S. Ser. No. 688,422, abandoned).

The rare earth metal-containing alloys are far less expensive but much superior in their adsorptivity of hydrogen gas, compared to the known non-rare earth metals, such as, barium and palladium, employed as a getter for hydrogen gas. However one of the critical disadvantages of the known rare earth metal-containing alloys is that their adsorptivity of hydrogen gas is superior only at room temperature or higher temperatures and not at low temperatures i.e., from room temperature to the temperature of liquid hydrogen or liquid helium. The improvement of the vacuum thermal insulation has, therefore, been directed to the use of the getter alloys which have a good adsorption such that traces of hydrogen gas in the vacuum should be completely removed by adsorption even at a very low temperature of the liquefied gas contained.

The inventors of the present invention have conducted extensive studies to search for rare earth metal-containing alloys suitable for the purpose and have succeeded in establishing that a lanthanum-containing ternary alloy expressed by the general formula

$LaNi_xCr_y$ where x has a value of from 1.0 inclusive to 6.0 inclusive, preferably from 2.0 inclusive to 6.0 inclusive, and y has a value of from 0.1 inclusive to 2.0 inclusive, preferably from 0.5 inclusive to 1.0 inclusive, is especially suitable for adsorbing hydrogen gas at a very low temperature. It has also been discovered by the inventors that a much greater adsorption can be obtained by the ternary alloy which has been activated by the manner as set forth herein.

The above ternary alloy in accordance with the present invention is prepared by melting together individually weighed amounts of lanthanum, nickel and chromium in an atmosphere of an inert gas, such as argon, and cooling the resulting alloy to solidification. Although it is desired that the component metals have as high purity as possible, if the cost of very pure metals is taken into consideration, conventionally small amounts of impurities are tolerable. In other words, the content of less than a few percent of cerium and other rare earth metals in the lanthanum metal or iron, copper, manganese, cobalt, aluminum and the like in the nickel of chromium metal may not have any disadvantageous effects on the hydrogen adsorption of the resulting alloys.

The above-described composition of the alloy in accordance with the present invention is critical. Lesser amounts of nickel or chromium in the alloy will decrease in the hydrogen adsorption and consequently require the use of an increased amount of the more expensive lanthanum metal. On the other hand, amounts of nickel and chromium in the alloy exceeding the above range will produce a considerably higher melting point and decreased uniformity of the alloy. This, in turn, results in an inferior adsorptivity and a poor reproducibility in the adsorption of hydrogen by the alloy.

The ternary alloy thus prepared is then crushed or pulverized into granules or powders for final use. While the particle size of such an alloy has substantially no influence on adsorption equilibrium it does effect the velocity of adsorption. Therefore the alloy may be used in the form of blocks in case the velocity of the adsorption is not important. For most practical uses, however, the alloy is in a finely divided state, e.g., 325 mesh or smaller by the U.S. standard screen scales. In the pulverizing process of the alloy, care should be taken to avoid overmilling, since powders having an increased surface area are very susceptible to surface oxidation by atmospheric oxygen which results in a remarkably decreased adsorptivity in the alloy. Therefore, it is recommended that the pulverization be carried out in an atmosphere of an inert gas, such as, argon or nitrogen. The pulverizing means may not be limitative and any conventional machines, such as, ball mills, hammer mills, jet mills and the like, can be employed insofar as they are designed suitably for the pulverization of alloys of this kind.

The powder of the ternary alloy having the above-defined composition exhibits an excellent adsorption of hydrogen at low temperatures. It is, however, preferable that the alloy powder is subjected to activation before it is put to use in the following manner. The alloy powder is heated at a temperature between 100° and 700° C. preferably from 200° to 500° C., for at least 30 minutes, preferably from 1 to 4 hours, in a stream of hydrogen gas under about atmospheric pressure. This may then be followed by two, and preferably three, or more repeated cycles of pressurization with hydrogen gas and evacuation in a pressurized vessel ending in an evacuation stage to as high vacuum as possible. The pressure to be attained in the stages of pressurization is at least 10 kg/cm$^2$, and preferably from 20 to 50 kg/cm$^2$, where the pressure is maintained for at least 5 minutes, preferably from 5 to 20 minutes, and the temperature during the pressurization and evacuation may be room temperature for convenience, although it is not limited to this temperature, though.

The thermally insulating container in accordance with the present invention may be constructed with more than two walls, or triple or more walled, to form two or more vacuum spaces in between. It is possible that each space between the adjacent two walls is evacuated separately or independently from the other. It is also possible to mount a suitable thermal insulator in the vacuum space or spaces in the same manner as in the double walled container. Such thermal insulators may have a honey-comb or porous as well as multilaminar structure made of a material having a low heat conductivity.

The material of the walls of the container is advantageously a metal, such as stainless steel, because of its mechanical strength and feasibility, so that a higher vacuum may be obtained, compared to other materials, such as plastics and glass. The shape of the container is not limitative but, usually, it is cylindrical or spheric, having one or more openings in the upper portion through which liquefied gases are introduced or discharged. The thickness of the vacuum between the walls is determined taking into consideration the balance between the effect of thermal insulation and the effective volume of the container, and is usually, in the range of a few centimeters.

The degree of vacuum in the container should be as high as possible but the highest possible vacuum is usually in the range of from $10^{-4}$ to $10^{-7}$ mmHg, depending on the performance of the evacuation means and the amount of the gases released from the walls into the vacuum. The vacuum containers in accordance with the present invention, are different from similar containers of the prior art, since they can maintain the degree of vacuum once established for a long time, without a gradual increase in pressure, by the presence of the getter alloy which is placed in the vacuum chamber and adsorbs the gases released from the wall surfaces.

The ternary alloy containing lanthanum is placed at any position within the vacuum chamber. When two or more vacuum chambers are provided and connected to each other through a conduit or conduits, the getter alloy may be placed in one of the vacuum chambers.

The amount of the lanthanum-containing ternary alloy to be used is determined depending on several factors, for example, the shape of the container, the material of the walls and the desired level of thermal insulation. Usually, however, it is sufficient that the alloy is used in an amount such that it weighs in the range of from 0.1 to 5g of, preferably, from 1 to 3g per liter of the volume of the vacuum chamber. Any smaller amounts can hardly give sufficient improvements in thermal insulation, while larger amounts are disadvantageous from an economical point of view since further improvements in thermal insulation are not realized thereby.

The thermally insulating container of the present invention provided with the lanthanum-containing ternary alloy within the vacuum provide a very much improved thermal insulation with durability longer than the conventional containers of this type. As described herein, however, decreases in the thermal insulation are caused not only by the residual hydrogen gas released from the metal walls but also by the gases commonly existent in the atmospheric air, such as, oxygen, nitrogen, argon, carbon dioxide, water and the like, though in smaller amounts than hydrogen gas. Therefore, the presence of only the lanthanum-containing ternary alloy in the vacuum may not be satisfactory with respect to the other gases since this kind of alloy is not effective for the removal of since atmospheric gases.

Further investigations of the inventors directed to the solution of the above problem with respect to the removal of the atmospheric gases other than hydrogen gas in the vacuum have lead to the conclusion that the use of an adsorbent having a specific surface area larger than $150m^2/g$ in addition to the lanthanum-containing ternary alloy would effect the purpose. That is to say, the thermal insulation and its durability with the thermally insulating containers can be improved more completely by means of the adsorbent serving for the removal of most atmospheric gases in co-operation with the ternary alloy serving to adsorb hydrogen gas.

The value of the specific surface area of the adsorbent is always determined by the so-called BET method, in which it is calculated by the amount of nitrogen gas adsorbed at a low temperature. The specific surface area of the adsorbent may be determined by any other alternative methods, such as the air permeation method, only for purposes of comparison to that value determined by the BET method.

The adsorbents suitable for use in accordance with the present invention include silica gels, silica-alumina gels, natural and synthetic zeolites, carbon black and the like. An example of the zeolite adsorbent which is especially suitable for the purpose is Zeoharb (trademark for the product by Osaka Oxygen Industries, Ltd., Japan), having a three-dimensional crystalline aluminosilicate structure with an average pore diameter of 0.5 to 0.6 nm and a specific surface area of $300m^2/g$ or larger. This product is very effective for the adsorption of atmospheric gases other than hydrogen, with a very large capacity and velocity of adsorption even at low temperatures and under low pressures.

The amount of the adsorbent necessary for obtaining a sufficient improvement effect in thermal insulation is generally in the range of from 10 to 30g per liter of the volume of the vacuum in the container. Smaller amounts are not able give any sufficient improvements, while larger amounts do not provide any remarkable, additional effects. When the adsorbent has a specific surface area smaller than $150m^2/g$, it must be used in an excessive amount to attain the purpose, thus resulting in disadvantages from economical point of view as well as from the designing of the container.

In the manufacture of the thermally insulating container of the present invention, the lanthanum-containing getter alloy and, if required, the adsorbent are mounted individually at appropriate positions within the space between the walls, while the space is evacuated to a high vacuum by means of a suitable vacuum pump. In carrying out the evacuation, it is advisable that the container is heated from outside as a whole or, particularly, at the part where the getter alloy and/or the adsorbent are positioned in order to achieve a higher degree of vacuum.

Now, referring to FIG. 1, numerals 1 and 2 indicate the outer and the inner walls, respectively, and are made of, for example, stainless steel. The space indicated by numeral 9 existing between walls 1 and 2 are evacuated to a high vacuum by a vacuum pump (not shown) connected to evacuation opening 7. A protecting cap 6 is provided to cover the tip formed by sealing off evacuation opening 7. Within the evacuated space 9 is provided a thermal insulator 3 of a multi-laminar structure made of a material having a low heat conductivity, surrounding the surfaces facing the vacuum on wall 2. A capsule 5 containing the ternary getter alloy powder is mounted on the outer surface of multilaminar thermal insulator 3 at the upper side. Capsules 4 containing the adsorbent are mounted on the surface facing the vacuum on wall 2 at the lower side. The positions at which the capsules containing the getter alloy or the adsorbent are mounted are not limited to those positions shown in the figure. Numeral 10 indicates an opening through which a liquefied gas is introduced in or discharged, with cap 8.

The following examples are submitted to illustrate further the present invention and not to limit the invention. From the descriptions in the examples, it will be seen that the degree of vacuum attained with the containers of the invention is much higher than those obtainable with similar conventional containers and also that decreases in the degree of vacuum with the containers of the invention are very small over a long period of time, thus offering a very great advantage in the shipping and storage of liquified gases.

EXAMPLE 1

Three ternary alloys were prepared by melting together weighed amounts of lanthanum, nickel and chromium metals in the proportions as indicated in Table I. Each of these alloys was pulverized on a ball mill, followed by screening with a 325-mesh screen (U.S. Standard), to form a powder.

The alloy powders thus produced were subjected to activation by first heating in a stream of hydrogen gas at 250° or 400° C. for 1 hour, followed by five of cycles each consisting of repeated pressurization in a pressurized vessel to a pressure of 30kg/cm$^2$G and evacuation with a vacuum pump.

Figure 2:
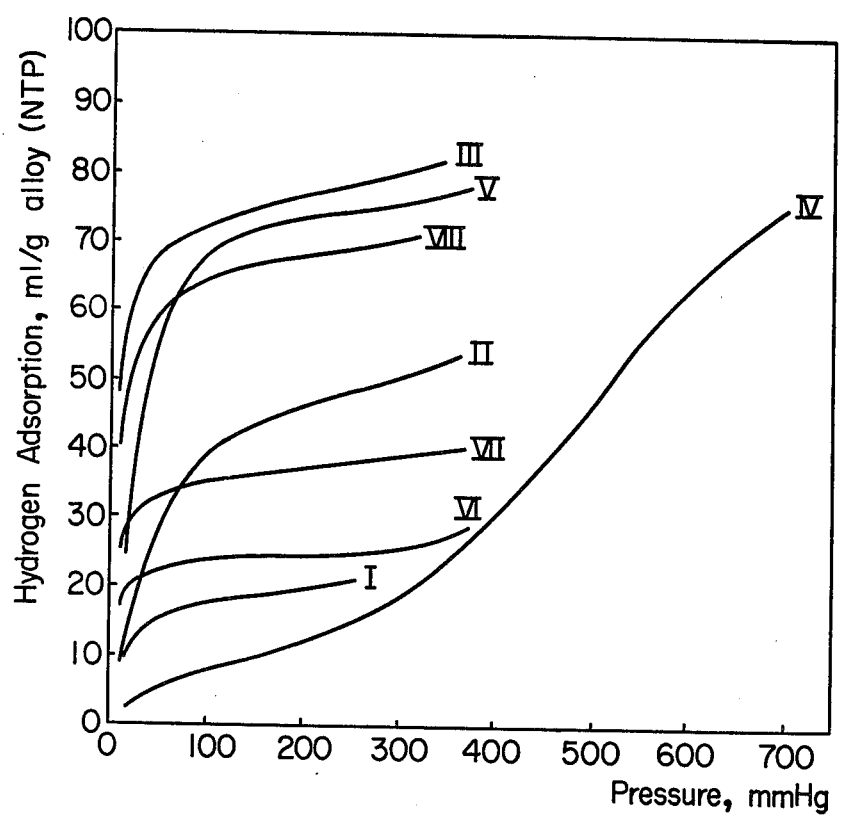
FIG. 2 is a graph showing the adsorption isotherms of hydrogen gas on the activated getter alloy as tested.

Adsorption isotherms of hydrogen gas on the resulting activated alloy powders were determined at 25, 0, −64 and −110° C. and the results are shown by way of FIG. 2. The relevant factors for each of curves I – VIII in FIG. 2 are mentioned in Table I. Curve VIII is for comparative purposes showing the adsorption isotherm of hydrogen gas on palladium metal at −196° C.

Table I

| Composition of Alloy | Activation Temperature | Adsorption Measurement Temperature | Curve No. |
|---|---|---|---|
| La$_{1.00}$Ni$_{3.55}$Cr$_{0.88}$ | 250° C. | 25° C. | I |
|  |  | 0° C. | II |
|  |  | −64° C. | III |
| La$_{1.00}$Ni$_{5.62}$Cr$_{0.57}$ | 400° C. | 25° C. | IV |
|  |  | −110° C. | V |
| La$_{1.00}$Ni$_{2.10}$Cr$_{0.63}$ | 250° C. | 25° C. | VI |
|  |  | −110° C. | VII |
| Palladium metal | — | −196° C. | VIII |

EXAMPLE 2

Three containers with double stainless steel walls forming outer and inner compartments as shown in FIG. 1, each having the same dimensions, were provided, the dimensions being the following. Of each outer and inner compartments, inner diameter: 49 and 43 cm; and depth: 82 and 72 cm, respectively, the capacity of the inner compartment being 100 liters and the volume of the vacuum formed in the container being 65 liters.

In one of the containers (Container No.1) was put a capsule containing 70g of the powder of the lanthanum-containing ternary alloy composed of La$_{1.00}$Ni$_{3.55}$Cr$_{0.88}$, which had been activated in the manner as set forth hereinafter, at the location as shown in FIG. 1 by numeral 5. In a second container (Container No. 2) were put a capsule containing 70g of the same activated alloy powder as above and two capsules containing 800g of an adsorbent as specified hereinafter at the locations as shown in FIG. 1 by numerals 5 and 4, respectively. In the third container (Container No. 3) was put a capsule containing the same amount of the same adsorbent as in the second container also at the same location for comparative purposes. Each container was provided with the thermally insulating material, as indicated in FIG. 1 by numeral 3, consisting of 15 laminated sheets of aluminum foil.

Each of these three containers was connected to the same vacuum line at 20° C. to attain the maximum possible degree of vacuum. The highest degree of vacuum attained in the three containers were as given in Table II.

The performance of each container in thermal insulation was tested by measuring the evaporation loss of liquid nitrogen with the container which had been charged with 50 liters of liquid nitrogen and kept standing in a room at 26° C. for 24 hours. The evaporation losses thus determined are shown also in Table II.

Table II

| Container No. | Provision of Alloy | Provision of Adsorbent | Highest Degree of Vacuum | Evaporation Loss |
|---|---|---|---|---|
| 1 | Yes | No | $5 \times 10^{-7}$ mmHg | 1,410 g |
| 2 | Yes | Yes | $8 \times 10^{-8}$ mmHg | 1,320 g |
| 3 | No | Yes | $5 \times 10^{-6}$ mmHg | 1,560 g |

The adsorption isotherms for the adsorbent used in this example are shown by way of FIG. 3, with respect to the adsorption of oxygen at temperatures of −26°, −70° and −110° C. under oxygen partial pressure below 16 mmHg.

Manner of Activation for the Alloy Powder

Alloy powder finer than. 325-mesh on the U.S. sieve series was heated in a stream of hydrogen gas at 250° C. for 2 hours, followed by 6 of the cycles each consisting of pressurization in a pressurized vessel to a pressure of 35kg/cm$^2$G where the pressure was maintained for 5 minutes and evacuation with a vacuum pump at room temperature.

Adsorbent

Zeolite adsorbent commercially available under the trade name of Zeoharb (product by Osaka Oxygen Industries, Ltd., Japan) having a particle size finer than 300-mesh (the U.S. Standard sieve series) and a specific surface area of larger than 380m$^2$/g as measured by the BET method. This adsorbent had been activated prior to application by heating at 350° to 400° C. The adsorbent is noted for its excellent adsorptivity to the atmospheric gases other than oxygen at low temperatures especially under their partial pressures lower than $10^{-1}$mmHg.

EXAMPLE 3

Four containers were provided and tested in the same manner as Container No. 2 of Example 2, except only that the composition of each lanthanum-containing ternary alloy used was set forth in Table III, instead of La$_{1.00}$Ni$_{3.55}$Cr$_{0.88}$, with the test results set out in the same table. Containers No. 4 and No. 5 are in accordance with the present invention, while Containers No. 6 and No. 7 are for comparative purposes.

Table III

| Container No. | Composition of Alloy | Highest Degree of Vacuum | Evaporation Loss |
|---|---|---|---|
| 4 | La$_{1.00}$Ni$_{5.62}$Cr$_{0.57}$ | $5 \times 10^{-8}$ mmHg | 1,280 g |
| 5 | La$_{1.00}$Ni$_{2.10}$Cr$_{0.63}$ | $1 \times 10^{-7}$ mmHg | 1,350 g |
| 6 | La$_{1.00}$Ni$_{0.60}$Cr$_{1.10}$ | $4 \times 10^{-6}$ mmHg | 1,550 g |
| 7 | La$_{1.00}$Ni$_{5.10}$Cr$_{1.05}$ | $5 \times 10^{-6}$ mmHg | 1,490 g |

EXAMPLE 4

Four containers (Nos. 8–11) were manufactured and tested just in the same manner as container No. 2 of Example 2 except only that the adsorbent Zeoharb was replaced with one of other adsorbents as specified in Table IV, with the test results set out in the same table. Container No. 11 with which was used an adsorbent having a specific surface area less than the standard is for comparative purposes.

Table IV

| Container No. | Adsorbent | Specific Surface Area* | Highest Degree of Vacuum | Evaporation Loss |
| --- | --- | --- | --- | --- |
| 8 | Molecular Sieve 5A | 400 m²/g | $1 \times 10^{-7}$ mmHg | 1,340 g |
| 9 | Alumina | 230 m²/g | $5 \times 10^{-5}$ mmHg | 1,080 g |
| 10 | Activated Carbon | 900 m²/g | $8 \times 10^{-6}$ mmHg | 1,160 g |
| 11 | Boneblack | 105 m²/g | $3 \times 10^{-4}$ mmHg | 1,390 g |

*Determined in accordance with the BET method.

EXAMPLE 5

Performance in thermal insulation was tested for the three containers provided in Example 2, after the same containers had been kept standing over a period of 6 months or 12 months from manufacture. The test was conducted in the same manner as in Example 2 by the evaporation loss of liquid nitrogen. The results are set out in Table V.

Table V

| Container No. | Evaporation Loss | |
| --- | --- | --- |
| | After 6 months | After 12 months |
| 1 | 1,430 g | 1,450 g |
| 2 | 1,320 g | 1,325 g |
| 3 | 1,600 g | 1,670 g |

What is claimed is:

1. A thermally insulating container for a liquefied gas comprising double walls, the space between the walls being evacuated, and a getter alloy provided in the evacuated space, having a composition expressed by the general formula $$LaNi_xCr_y$$

where x has a value of from 1.0 inclusive to 6.0 inclusive and y has a value of from 0.1 inclusive to 2.0 inclusive.

2. The thermally insulating container as claimed in claim 1 wherein said getter alloy is a powder having a particle size distribution equal to or finer than 325 mesh according to the U.S. Standard sieve series.

3. The thermally insulating container as claimed in claim 1 wherein said getter alloy is one which has been activated by heating at a temperature between 100° and 700° C. for at least 30 minutes in an atmosphere of hydrogen gas, followed by at least two repeated cycles each cycle consisting of a step of pressurization using hydrogen gas to a pressure of at least 10 kg/cm², the pressure being maintained for at least 5 minutes, and a step of evacuation.

4. The thermally insulating container as claimed in claim 1 wherein said walls are made of stainless steel.

5. The thermally insulating container as claimed in claim 1 wherein the degree of vacuum in the evacuated space is at least $1 \times 10^{-4}$ mmHg.

6. The thermally insulating container as claimed in claim 1 wherein the amount of said getter alloy is in the range of from 0.1 to 5 g per liter of the volume of the evacuated space.

7. The thermally insulating container as claimed in claim 1 comprising additionally, in the evacuated space, an adsorbent having a specific surface area of at least 150 m²/g.

8. The thermally insulating container as claimed in claim 7 wherein the amount of said adsorbent is in the range of from 10 to 30 g per liter of the volume of the evacuated space.